SCHEME FOR CIRCUMVENTING BAD MEMORY CELLS

Filed June 15, 1966 Sheet 1 of 6

INVENTOR
WILHELM ANACKER

BY Charles P. Boberg
ATTORNEY

United States Patent Office 3,434,116
Patented Mar. 18, 1969

3,434,116

SCHEME FOR CIRCUMVENTING BAD MEMORY CELLS

Wilhelm Anacker, Yorktown Heights, N.Y., assignor to International Business Machines Corporation, Armonk, N.Y., a corporation of New York Filed June 15, 1966, Ser. No. 557,714
U.S. Cl. 340—172.5 11 Claims
Int. Cl. G06f 7/24

ABSTRACT OF THE DISCLOSURE

Defective bit cells having a random distribution within a large word-oriented memory are rendered ineffective by a scheme which minimizes the proportion of the total storage capacity that must be devoted to corrective action. Each word line in the main memory is divided arbitrarily into a plurality of subword storage sections or registers which can be effectively replaced by good replacement-subword storage sections in the event that any of the subword registers may contain one or more bad bit cells. Associated with each word line in main memory is a set of error flag cells for denoting the number and positions of the subword registers containing bad cells in that line, together with a replacement address store which contains the address of the replacement storage section, or the first in a series of replacement storage sections if more than one defective register is to be replaced. During data storage operations information is written into both the defective subword registers and the replacement subword registers, but during readout only the good subwords are transferred out of storage.

This invention relates to random-access memories, and especially to batch-fabricated bulk memories.

As employed herein, the term "batch-fabricated memory" means a type of memory in which the various bit storage elements are formed in a fixed spatial relationship with each other, rather than being formed individually as loose storage elements which subsequently must be arranged in a desired spatial relationship. The term "bulk memory" refers to a memory system having a storage capacity of at least ten million bits, or more commonly a billion bits, which for convenience may be apportioned among a number of basic operating modules (BOM's) each constituting a bulk memory in itself. Batch fabrication has been proposed as a technique for building bulk memories and is considered at present to be the only feasible way of building such memories; hence the terms "bulk memory" and "batch-fabricated memory" may be considered synonymous for practical purposes and will be used interchangeably herein.

Experience in the batch-fabrication of bulk memory arrays has indicated that one may expect about one bit cell in one thousand to be defective, that is, incapable of being switched from one binary state to another binary state or else incapable of remaining in a selected binary state to which it has been switched. These defective cells are apt to be distributed in an unpredictable fashion throughout the array. The nature of a batch-fabricated memory is such that it would not be feasible to remove the defective bit cells physically from the array and replace them with good cells. Instead, some way must be provided for functionally eliminating from the operation of such an array those storage registers that contain defective bit cells while permitting the defective cells to remain physically in the array.

One method which has been proposed for accomplishing this objective is to include in the process for manufacturing bulk memories a corrective procedure whereby defective word lines are located by diagnostic test and are permanently disconnected electrically (but not structurally) from the rest of the array, before the bulk memory leaves the factory. This method is apt to be unsatisfactory because it increases the manufacturing cost of a large array by a considerable amount; furthermore, it wastes many good bit cells which happen to be on the same word lines as the defective bit cells.

Other schemes have been proposed for causing bypass connections to be established automatically around the defective bit cells during the normal operations of the memory, or automatically performing some equivalent corrective operations, without interrupting any of the fixed array wiring. Many such schemes are limited to situations in which not more than a certain small number of defective bit cells is expected to occur in any single word line or subdivision thereof, or in which the defective cells, bytes or characters have some predetermined placement in the array. These assumptions are not always practical ones to make, especially in the larger-size arrays. Other corrective schemes of this nature make use of auxiliary content-addressable memories to locate those groups of cells in the array which are known to contain bad bits, so that a corrective action can be initiated automatically whenever such a group is addressed. In the current state of the art such techniques have rather severe limitations with regard to operational speed and memory size, because content-addressable memories in the larger sizes tend to be too slow for practical use at the present time.

An object of the present invention is to enable good cells to replace bad cells in a batch-fabricated memory during normal operations thereof without interrupting the fixed wiring of the array and without regard to the number of bad bit cells that may occur in any single word line or word storage segment of the array, or in the memory as a whole, and also without regard to the relative positions of the defective cells or the defective word storage segments within the array.

Another object is to enable reliable word-storing cell groups to replace defective word-storing cell groups automatically during high-speed memory operations without substantial loss of operating time and with only inconsequential waste or sacrifice of the many good cells which are located on those word lines that contain the bad cells.

The invention has several noteworthy features by which it is possible to correct the greatest anticipated number of bad bits having the worst possible distribution in the array employing corrective circuitry that involves only a modest additional expenditure and which does not unduly extend the time required for reading and writing operations. The present teachings involve dividing each word line of the bulk memory into a large number of subword cell-groups for replacement purposes and employing a relatively small read-only memory (which does not require its own individual word selection scheme) for registering the locations of the defective subword cell-groups in the bulk memory, as well as for registering the locations of alternative subword cell-groups in a replacement memory, whereby it is possible to compensate for all of the bad bits that are expected to occur in the array under the worst anticipated conditions merely by providing a replacement memory which has a bit storage capacity equal to about six percent of the bulk memory capacity and a read-only memory which has a bit storage capacity equal to about four percent of the bulk memory capacity. When a word line containing a subword with one or more bad bits is addressed, the read-only memory automatically selects from the replacement memory a good subword cell group and causes the same to be effectively substituted for the bad subword cell-group in the active word line, such substitution being effected as many times as needed for each active word line. The only good memory bit cells which are wasted or sacrificed in this process are those contained in the replaced subword or subwords, which are only a very small fraction of the bits contained in an entire word line. Under the worst conditions, not more than six percent of the good cells in the array are sacrificed. Thus, provision is made herein for replacing the largest possible number of bad bits with the minimum waste of good bits, using only a modest amount of corrective equipment including auxiliary read-only and replacement memories that together have a bit storage capacity which is only about ten percent of the bulk memory capacity.

The operations of these auxiliary memories can be made sufficiently rapid so that the total replacement time is substantially no greater than that required for a normal read and/or write cycle. If desired, the read-only memory and/or the replacement memory can be physically part of the bulk memory array or its basic operating modules. It may be noted also that the invention imposes no limitations upon the number of defective subwords per word line, nor the number of defective bits per subword, nor the relative positions of the defective bits or subwords; nor does it require that certain arbitrary combinations of bits be pre-empted for use as corrective codes.

The foregoing and other objects, features and advantages of the invention will be apparent from the following more particular description of a preferred embodiment of the invention, as illustrated in the accompanying drawings, wherein.

In designing an automatic bad-bit replacement scheme, one must give consideration to factors which are conducive to economical construction and factors which are conducive to speed. If speed is the dominant consideration, provisions can be made in accordance with the invention for replacing all of the defective sub-words on a word line concurrently, during a time interval no greater than that required for a normal memory cycle. Such an approach, however, will require more equipment than a scheme wherein several defective subwords on the same word line are replaced in rapid succession, using only the equipment that is needed to replace a single defective subword at a time. The latter approach is the one that is disclosed herein, but it should be understood that the invention is not necessarily limited to this particular mode of operation.

Figure 1:
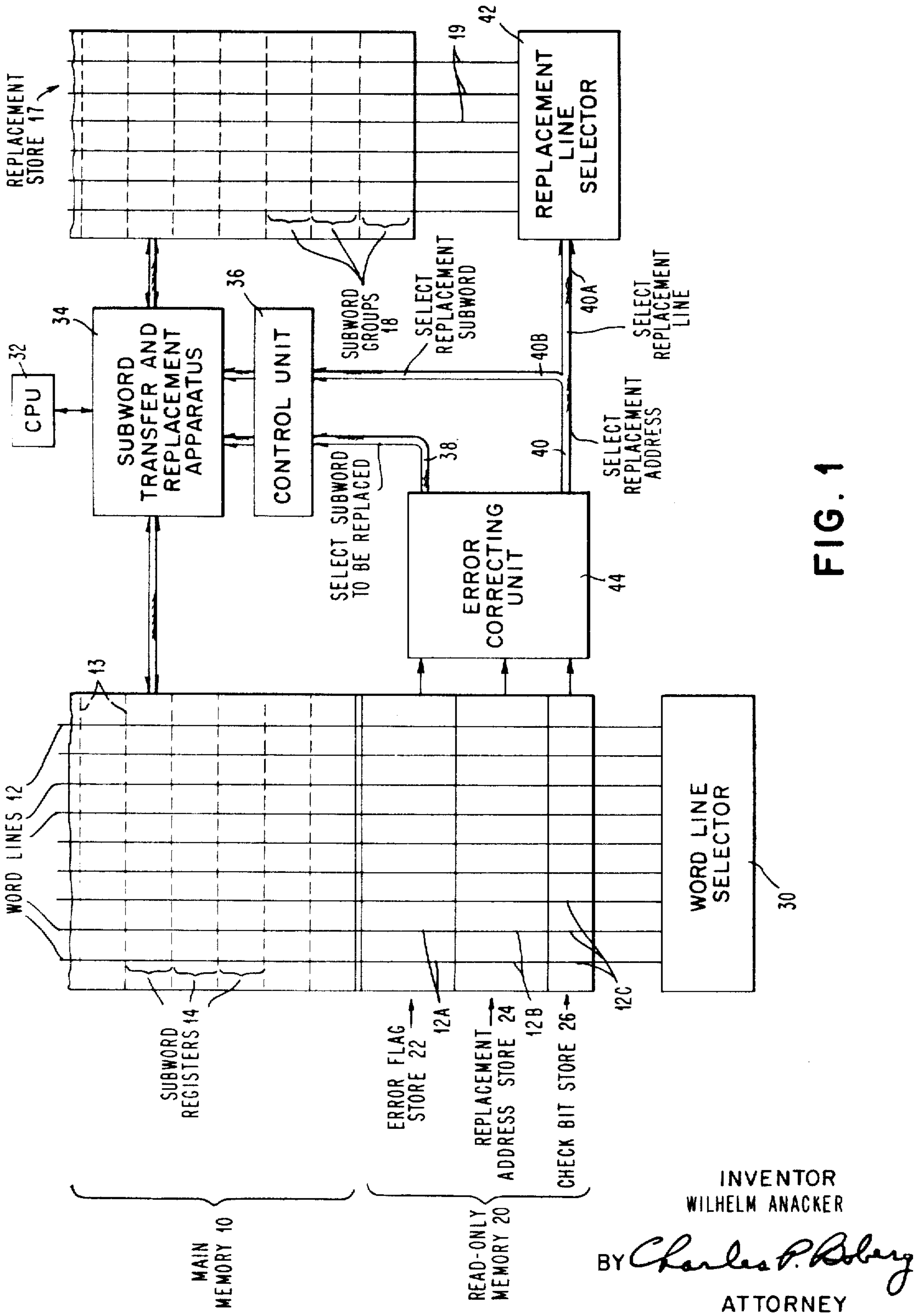
FIG. 1 is a general block diagram of a bulk memory system embodying the principle of the invention.

FIG. 1 is a general illustration of a random-access memory system in which the principle of the invention is embodied. This memory system includes as its principal component a batch-fabricated main memory 10 of a conventional word-oriented type having binary bit cells respectively arranged at the crossover points between bit-sense lines 11, FIG. 5, and word lines 12. Each bit-sense line 11 comprises a conductive strip of copper, for example, on which there is a film (or two magnetically coupled films) of magnetic material such as permalloy. The bit-sense lines perform both writing and reading functions, as do the word lines also. The portions of each magnetic film strip that lie beneath the respective word lines 12 function as bit cells for storing binary digit representations in accordance with well-known practice. There may be other instances (as described hereinafter) where sense lines which do not serve a writing function are employed. The various bit-sense lines 11 extend parallel with the dashed lines 13, FIG. 1, which demarcate the subword registers 14 that are a distinctive aspect of the present invention as hereinafter described. Thus, each of the word lines 12 is associated with a number of bit cells equalling the number of bit-sense lines (or sense lines) extending across the array.

Binary digital information is magnetically recorded or "written" in the various bit cells of a selected word line by energizing that word line coincidentally with the selective energizations of the various bit-sense lines in accordance with the binary information to be stored. When such stored information is to be read out, the selected word line is energized for producing on the bit-sense lines (or sense lines) various signal voltages which are indicative of the stored data representations. Such readout can be destructive or nondestructive, the distinction being immaterial insofar as the present invention is concerned. Inasmuch as these operations are well understood by those skilled in the art, no further description thereof is deemed necessary.

In any batch-fabricated memory, as explained hereinabove, there is a probability that even with the most reliable manufacturing methods, as many as one out of every thousand bit cells in the array will be defective, that is, incapable of reliably storing binary information. Thus, in a billion-bit memory, for example, one can expect to find as many as a million defective bit cells distributed in an unpredictable manner throughout the array. The nature of a batch-fabricated memory is such that it would not be economical to replace the bad cells physically with good cells. Therefore, some alternative procedure must be adopted whereby the bad bit cells can remain physically in the array while being effectively replaced with good bit cells during writing and reading operations. It is an objective of the present invention to accomplish such replacement operations in the most expeditious and economical manner which is possible at the present time.

In a typical batch-fabricated memory, each word line may contain as many as a thousand bit cells. so that on the average there will be one defective bit cell per word line. Obviously it would not be economical to discard all of the good bit cells in a word line merely because one, or a small number, of the bit cells in this line are defective. Rather than treat the entire word line as a single storage unit, therefore, it is preferable instead to subdivide each word line 12 into a large number of subword registers 14, FIG. 1, each containing a reasonably small number of bit cells. As an example, there may be sixteen subwords having approximately sixty bits each. The number of subwords per word line can be adjusted for optimum results. Very few of the subword registers 14 in a word line 12 are likely to contain defective bit cells. Nearly all of them will be perfect, as a rule. To replace those subword registers which are defective, it is necessary to provide only a small number of replacement subword cell-groups. These subword replacement groups are contained in a replacement store 17, FIG. 1, which can be either a separate memory unit that has been tested to insure that all of the usable subword groups therein are reliable, or it can be a small portion of the main memory 10 in which all of the addressable subword registers are good.

The replacement store 17 operates on the same principle as the main memory 10. That is to say, it has bit cells arranged at the crossings between orthogonally related word lines 19 and bit-sense lines (not shown) which can be selectively energized for writing information into the store or reading information therefrom. The bit cells of the replacement store 17 furthermore are arranged in subword groups 18, each of which is capable of effectively replacing a defective subword register 14 in the main memory 10. The subword cell groups 18 which are located on any one word line 19 of the replacement store 17 may serve as replacements for defective subword registers 14 which are located on a large number of the main memory word lines 12.

Associated with the main memory 10, preferably as an adjunct to it, is a small read-only memory 20, FIG. 1, which consists of three read-only stores 22, 24 and 26. Error flag store 22 contains a number of bit cells arranged on a plurality of lines 12A, which respectively correspond to the word lines 12 of the main memory 10 and may be physically joined to or included in such lines. Each of the lines 12A contains a number of bit cells equal to the number of subword registers 14 on the corresponding word line 12. Information concerning the condition of the various subword registers 14 is permanently stored in the error flag cells of the store 22. For each defective subword register 14, there is an identifying information bit (such as a binary "1") stored in the corresponding error flag cell of the store 22. The manner in which this information is utilized will be explained presently.

The replacement address store 24 contains bit cells which are arranged on various lines 12B, which respectively correspond to the word lines 12 of the main memory 10 and may be physically part of such lines. The replacement address cells on each line 12B store the address of a particular subword bit-cell group 18 in the replacement store 17. Each of the subword groups 18 may, in effect, replace a defective subword register 14 in the corresponding word line 12 of the main memory 10, as explained above. If the word line 12 contains more than one defective subword register 14, the replacement address cells in the store 24 will indicate only the first of several adjacent addresses in the replacement store 17 where the replacement subword groups 18 for those defective registers 14 are located.

The third section of the read-only memory 20 is a check bit store 26, which contains bit cells arranged on a plurality of lines 12C respectively corresponding to the word lines 12 of the main memory 10. The cells on each line 12C can be utilized for storing check bits or error correction codes adapted to be utilized in a conventional manner for checking the accuracy of information read out from the other sections 22 and 24 of the read-only memory 20.

Appropriate information is stored permanently in the read-only stores 22, 24 and 26 as the result of a diagnostic test performed upon the main memory 10 before it is placed in service. As mentioned above, the various array lines 12A, 12B and 12C of these three stores can be physically continuous with the word lines 12 of the main memory 10, so that these array lines are energized concurrently with the energization of their corresponding word lines 12. Thus, each time a word line 12 is energized, whether this occurs during a reading or writing operation, the associated error flag cells, replacement address cells and check bit cells in the read-only stores 22, 24 and 26 are activated for reading out the information stored therein.

The word line selector 30 is a conventional apparatus for selectively energizing the word lines 12 of the main memory 10 and (in this instance) their corresponding array lines 12A, 12B and 12C in the read-only stores 22, 24 and 26, respectively. This arrangement dispenses with the need for providing the read-only memory 20 with its own separate word selection scheme. In practice, the word line selector 30 comprises decoding and drive elements operable under the control of a memory address register for selectively energizing any one of the word lines 12, such equipment not being disclosed herein.

The functions of the main memory 10 are to store data, to furnish such stored data to a central processing unit 32 (or other data processor) when required, and to receive data from said processor for storage pending further use of such data by the system. It is, of course, undesirable that the stored data furnished to the processing system be obtained from any of the defective storage registers in memory 10. To avoid this, arrangements are provided herein to insure that data coming from the processor 32 which ordinarily would be routed to a defective subword register 14 in the main memory 10 is routed alternatively to a replacement subward cell group 18 in the replacement store 17. Then, if the processing unit 32 calls for data to be furnished by a defective subword register 14, the system automatically substitutes data furnished by the subword cell group 18 which is allocated to that defective subword register 14. These operations are performed by a subword transfer and replacement apparatus 34, which operates in response to data furnished by a control unit 36. The control unit 36 operates under the control of the error flag store 22 and partially under the control of the replacement address store 24 (through the intermediary of an error correcting unit 44) as indicated in FIG. 1.

Let it be assumed, for example, that information is to be read out of storage into the processing unit 32. Customarily the processing unit 32 will call for an entire word-line of information to be read from the main memory 10. If all of the subword registers 14 on the selected word line 12 are perfect, then the entire contents of this word line will be read into the unit 32, and no replacement thereof, in whole or in part, is needed. The fact that the entire word line is good is indicated by the fact that all error flag bits in that line are 0's. However, if one or more subword registers 14 in this word line 12 are defective (as indicated by one or more "1" flag bits), then a replacement operation is required. In a general way, this is accomplished as follows:

The word line selector 30 energizes a selected word line 12 and its auxiliary line sections 12A, 12B and 12C. The read-only stores 22, 24 and 26 thereupon read out the information respectively stored in their corresponding lines 12A, 12B and 12C. The error flag store 22, according to the state of its error flag cells, furnishes a distinctive control signal represented by the flow line 38, FIGS. 1 and 2, to the control unit 36. (The intervening function performed by the error correcting unit 44 is disregarded for the present.) The signal 38 conditions the apparatus 34 to select the subword register 14 in the main memory 10 which is to be effectively replaced. The replacement address store 24 furnishes a distinctive control signal represented by the flow line 40, FIGS. 1 and 2, which divides into a line address component represented by the flow line 40A that goes to a replacement line selector 42 for energizing a selected line 19 of the replacement store 17, and a subword address component represented by the flow line 40B that goes to the control unit 36 for conditioning the apparatus 34 to select the particular subword cell group 18 on the active line 19 that is to be effectively substituted for the defective subword register 14. Thus, the correct replacement subword is matched to the defective subword which is being replaced.

During a writing operation a similar procedure is followed, which results in a subword replacement cell group 18 in replacement store 17 being effectively substituted for a defective subword register 14 in main memory 10 to store the information supplied by the processor 32.

To insure that the control information furnished by the read-only memory 20 is not itself erroneous, the contents of the three read-only stores 22, 24 and 26 are first read out to an error correcting unit 44, wherein the check bits read out of the store 26 are utilized to check the accuracy of the information read out of the stores 22 and 24. The error correcting unit 44 is of a conventional type adapted to use any of the familiar error correction technique, such as the Hamming code, for example, to invert any bit which has been incorrectly read out of the read-only memory.

If more than one error flag cell located on a single line 12A is active (thereby indicating the presence of more than one defective subword register 14 in the corresponding word line 12), the error signal 38 accordingly conditions the control unit 36 to extend or prolong the subword replacement operation until all of the defective subwords in the active word line 12 have been effectively replaced.

While the main memory 10 is depicted in FIG. 1 as a single unit, in practice it may comprise a number of basic operating modules (BOM's) which are functionally interrelated. In a bulk memory having, for example, one million word lines, it would not be feasible to provide bit-sense lines of sufficient length to accommodate a million bit storage positions apiece without making some provision for intermediate signal regeneration or booster amplification at intervals along each line, as may be required.

Figure 2:
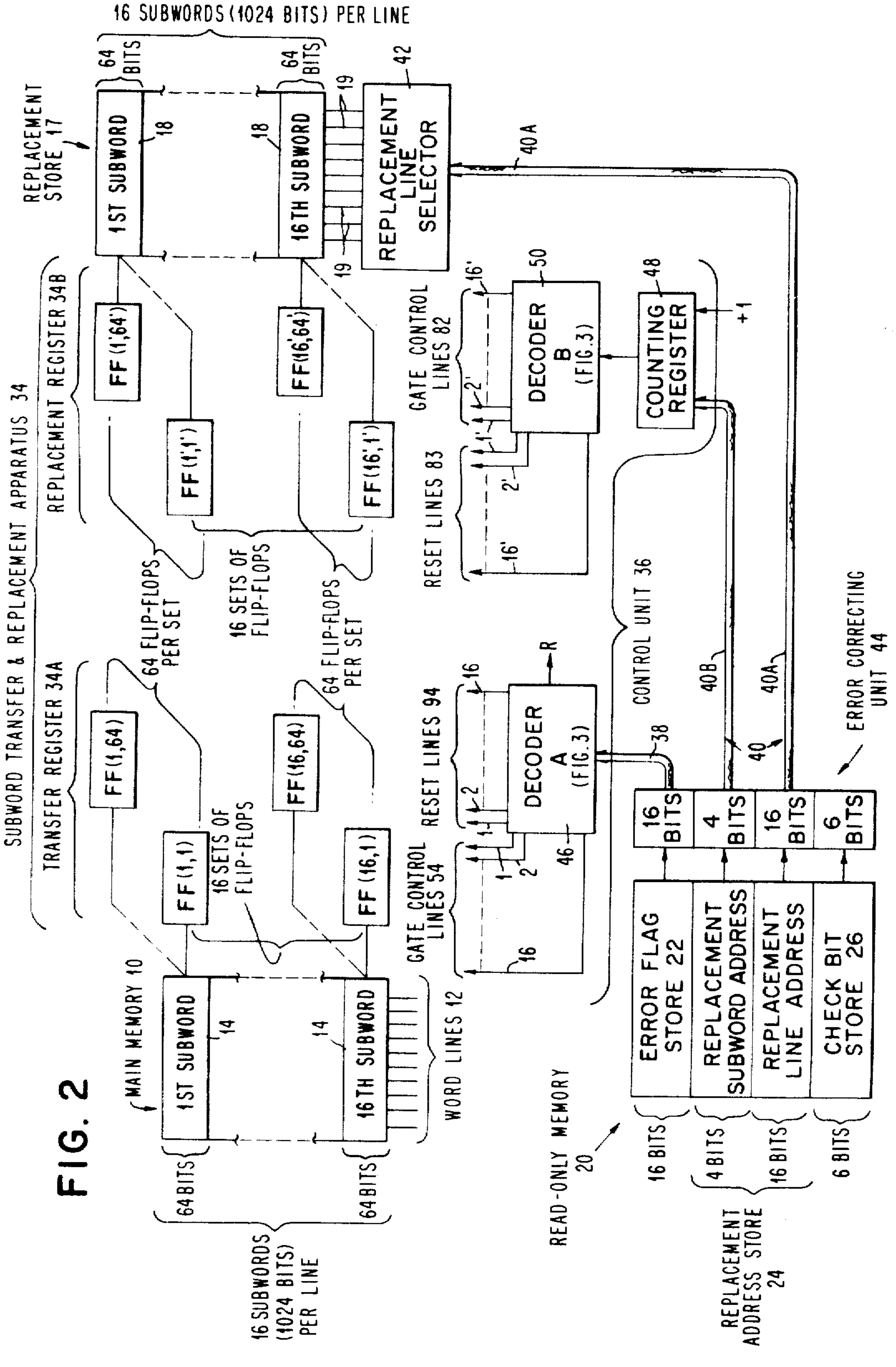
FIG. 2 is a block diagram which illustrates in a more specific form some of the apparatus shown in FIG. 1.

FIG. 2 shows in a little greater detail the manner in which the components of the memory system illustrated in FIG. 1 are constructed. It is assumed in the present instance that each word line 12 of the main memory 10 contains 1024 bits which are arbitrarily grouped into 16 subwords of 64 bits each. There are one million of these word lines in the main memory, which can be divided into smaller modules for convenience, each of these modules being a bulk memory in itself. The replacement store 17 is arranged in a similar fashion, each word line 19 therein containing 16 subwords of 64 bits apiece. However, the capacity of the replacement store 17 is much smaller than that of the main memory 10. Let us assume that the main memory 10 contains, as the worst possible case, approximately 1 million defective bit cells which are distributed throughout the same number of subwords. This would require the replacement store 17 to have a capacity of approximately 1 million subwords, and assuming that there are 16 subwords per word line, the replacement store 17 would have to contain approximately 63 thousand word lines. Thus, the storage capacity of the replacement store 17 would have to be just a little more than 6% of the main memory capacity.

The subword transfer and replacement apparatus 34, FIG. 1, comprises two sets of input-output registers, 34A and 34B, partially shown in FIG. 2. The input-output register 34A is designated herein the "transfer register," its function being to serve as a temporary storage for information which is being transferred between the memory 10 or 17 and the central processing unit 32 of the system. The input-output register 34B is herein designated the "replacement register," and its function is to serve as a temporary store for information which passes between the replacement store 17 and the transfer register 34A.

As shown in FIG. 2 (and also to a certain extent in FIG. 4), the transfer register 34A comprises 16 sets of flip-flops (FF), each set corresponding to one of the 16 subwords that can be stored on any word line 12 of the main memory 10. Each of these 16 sets of flip-flops contains 64 flip-flops, respectively corresponding to the 64 bits in a subword. For example, the first subword register of the main memory 10 is associated with 64 transfer register flip-flops arranged in a series FF(1, 1) to FF(1, 64), inclusive. The 16th subword register is associated with 64 transfer register flip-flops respectively designated FF(16, 1) to FF(16, 64), inclusive. The transfer register flip-flops in the intermediate sets (not shown) are similarly designated to correspond with their respective subword registers in the main memory 10.

In the replacement register 34B there is a similar arrangement of flip-flops in sets corresponding to the subwords in the replacement store 17. Thus, there are 64-flip-flops designated FF(1′, 1′) to FF(1′, 64′) associated with the first subword in the replacement store 17. Other sets of flip-flops in the replacement register 34B are similarly designated to correspond with their respective subwords in the replacement store 17.

The register flip-flops are extremely reliable in their operation and can be assumed to function perfectly at all times, insofar as the present disclosure is concerned. Conventional error checking and correction circuitry can be associated therewith if required, however.

Within the read-only memory 20, FIG. 2, each word line contains the following bit storage cells: 16 error flag bit cells contained in the store 22, 20 replacement address bit cells contained in the store 24 (including 16 bits for designating the line address and 4 bits for designating the subword address in the replacement store 17), and 6 check bit cells contained in store 26. This makes a total of 42 bit cells in each word line of the read-only memory 20. Whenever a word line 12 of the main memory 10 is energized during a read operation, or during a "clear" cycle which precedes a write operation, a word of control information is read from the corresponding line of the read-only memory 20. The 42 bits of the control word first are entered into the error correcting unit 44, where the 6 check bits are utilized in a well-known fashion to check the accuracy of the other 36 bits that have been read from the read-only stores 22 and 24. The error correcting unit 44 then performs any bit inversions which may be required before emitting the control signals represented by the lines 38 and 40, which govern the subword replacement operations.

Figure 3:
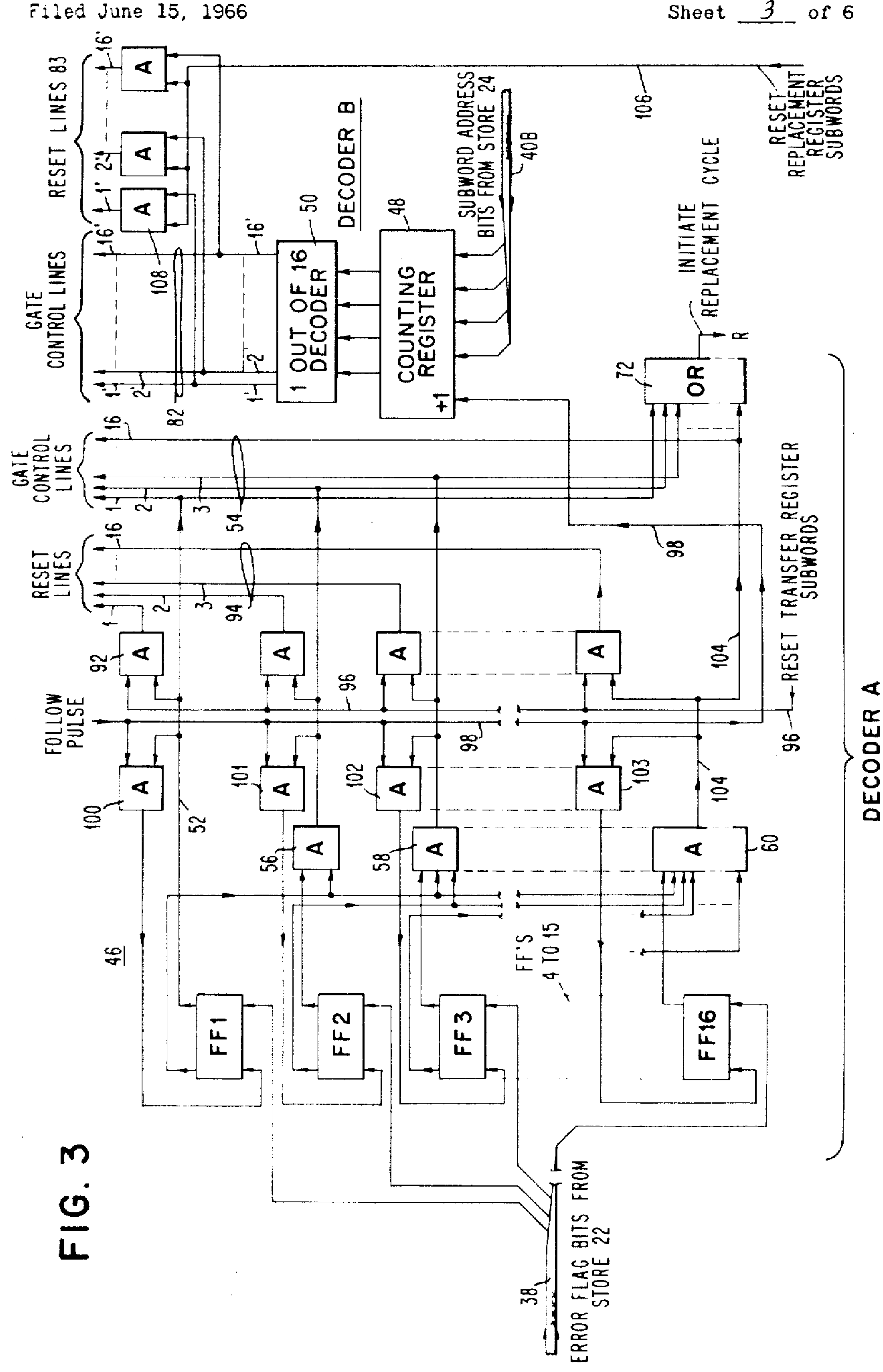
FIG. 3 is a partial circuit diagram of a control unit which is utilized in the memory system of FIGS. 1 and 2.

The 16 error flag bits from the read-only store 22 are entered into a decoding unit 46, also designated "decoder A," the internal construction of which is shown in FIG. 3. Decoder A contains a series of flip-flops FF1 to FF16, inclusive, for respectively storing the incoming error flag bits. Each of the flip-flops FF1 through FF16 is assigned to a respective one of the 16 subwords in the main memory 10. Thus, for example, if the first subword register in a particular word line of the main memory 10 contains a defective bit cell, a binary 1 is stored in the corresponding error flag cell of the read-only store 22. When this error flag bit is read out, it sets the flip-flop FF1, FIG. 3 to its "1" state, thereby indicating that the first subword register in the main memory line under consideration is defective. Thus, the binary 1 and 0 settings of the flip-flops FF1 through FF16 will represent the defective or operable states, respectively, of the corresponding subword registers in the selected main memory word line. In a manner which will be explained in detail presently, the respective settings of the flip-flops FF1 through FF16 determine whether or not any of the incoming data subwords are routed to the replacement store 17 during a write operation, and they also determine whether or not any of the outgoing data subwords are read from the replacement store 17 during a read operation.

When a line of data is read out of the replacement address read-only store 24, FIG. 2, 16 of the 20 replacement address bits are entered into the replacement line selector 42 for selecting one of the word lines 19 of the replacement store 17. The other four replacement address bits are entered into a binary counting register 48, FIGS. 2 and 3, to determine which of the 16 subword-storing cell groups 18 in the selected word line 19 will be activated. If only one replacement subword is required, the setting of the register 48 will correspond exactly to the four subword address bits which have been read out of the store 24. If additional replacement subwords are needed, the setting of the register 48 will be incremented by 1 each time an additional replacement subword is required. The four-bit output of the register 48 is entered into a decoding unit 50 also designated "decoder B," FIGS. 2 and 3. Decoder B controls the settings of 16 sets of replacement register flip-flops, each set containing 64 flip-flops, in the replacement register 34B. The first set of replacement flip-flops, designated FF(1′, 1′) to FF(1′, 64′), are allocated to the first subword group of the replacement store 17. The other sets of replacement flip-flops are similarly allocated to the remaining subword groups of the replacement store. These replacement register flip-flops serve as an input-output register for the replacement store 17, as mentioned hereinabove.

As an example, let it be assumed that the first and the sixteenth subword registers 14 in a given word line 12, FIG. 1, of the main memory 10 are defective. When this fact is ascertained during the final diagnostic test of the memory system, the corresponding line 12A of error flag cells in the read only store 22 is conditioned to store binary 1 bits in the first and sixteenth cell positions and binary 0 bits in the other cell positions, thereby establishing error flags at the first and sixteenth positions only. Where there are one or more defective subword registers 14 in a main memory word line, the information that is incorrectly stored in these subword registers must also be correctly stored in a like number of subword registers or cell groups of the replacement store 17. However, the positions of these replacement subwords do not generally have to correspond with those of the defective subword registers in the main memory. Thus, in the example just assumed, where the first and sixteenth subword registers 14 of the selected main memory word line 12 are defective, the corresponding replacement subwords may be stored in the first and second subword storage groups 18 on a particular word line 19 of the replacement store 17, or in two other adjacent subword groups on this or any other word line 19 of the replacement store. It is desirable that all replacement subwords relating to the same word line of the main memory occupy adjacent subword positions on a single word line of the replacement store 17, in order to simplify the replacement and transfer circuitry.

Continuing with the present example, the first and sixteenth error flag bits will cause the decoder A flip-flops FF1 and FF16, FIG. 3, to be set in their binary 1 states. In the presently disclosed scheme it is desirable that only one of these settings be effective at any given time, the other setting or settings being held in abeyance until needed. The means for accomplishing such sequential functioning will be explained presently. When the flip-flop FF1, FIG. 3, is set in its binary 1 state, its output line 52 is energized. This line 52 is connected to one of a group of gate control lines 54, there being one such line for each of the 16 flip-flops in the decoder A. The other gate control lines 54 are respectively connected through AND gates such as 56, 58 and 60, FIG. 3, to their respective flip-flops FF2 to FF16. These AND gates are operated in such a manner as to control the sequential energization of the gate control lines 54. As long as any preceding decoder flip-flop is in its binary 1 state, the AND gate associated with any given one of the flip-flops FF2 to FF16 will remain closed. Thus, for instance, the AND gate 56 associated with FF2 is closed so long as FF1 is in its binary 1 state, but it will be conditioned to open when FF1 is reset to its binary 0 state. (Whether or not this gate actually opens will depend also upon whether its own flip-flop FF2 is in a "1" state.)

We have assumed that when the first error flag bit entered decoder A, it caused FF1, FIG. 3, to assume its binary 1 state, thereby energizing the related output line 52 and the "number 1" gate control line 54 connected therewith. Energization of the number 1 gate control line 54 applies positive potential upon one terminal of each of a series of AND gates such as 62, FIG. 4, which are respectively associated with each of the first-subword transfer flip-flops (1, 1) to (1, 64), FIGS. 2 and 4, in the transfer register 34A. It is understood, of course, that there actually will be 64 of these gates 62 respectively associated with the 64 transfer flip-flops which are in this first-subword set. A second input terminal of each AND gate 62 is connected to the binary 1 output terminal of its associated transfer flip-flop. A third input terminal of each AND gate 62 is connected to a "Replace Write" control line 66, the function of which will be explained presently. This control line 66 is energized whenever information is to be transferred from the central processing unit to a replacement subword store 18 in the replacement memory 17.

Figure 4:
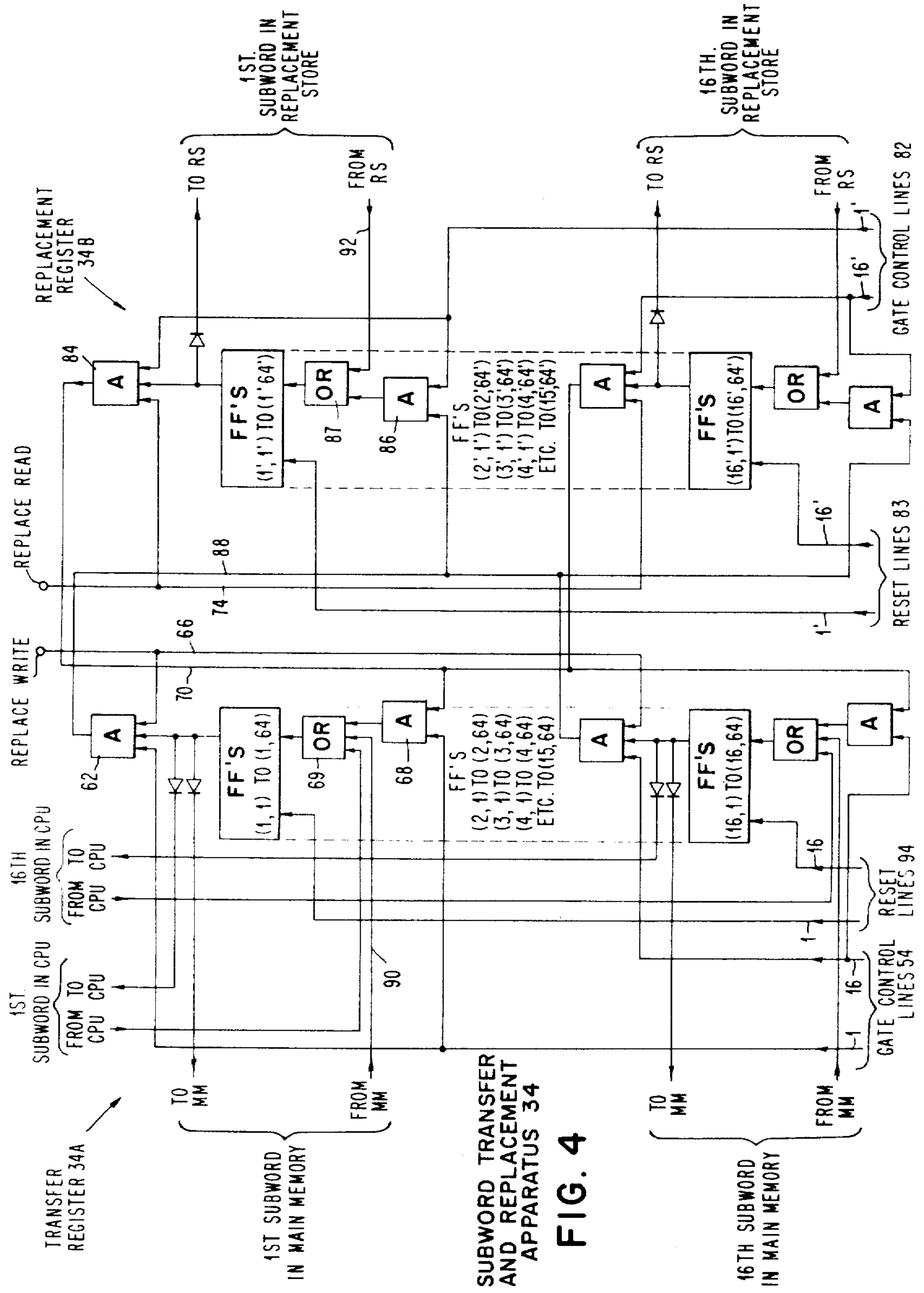
FIG. 4 is a partial circuit diagram of certain input-output registers which are utilized in the memory system of FIGS. 1 and 2.

Energization of the number 1 gate control line 54, as aforesaid, also applies positive potential upon one terminal of each of a series of AND gates as 68, FIG. 4, that are respectively associated (through a corresponding series of OR gates 69) with the binary 1 input terminals of the transfer flip-flops (1, 1) to (1, 64). The other input terminal of each AND gate 68 is connected to the respective one of a parallel group of common transfer lines 70 associated with correspondingly positioned replacement flip-flops in the replacement register 34B, as will be explained presently.

AND and OR gates similar to the gates 62, 68 and 69 are associated with each of the other transfer flip-flops in the transfer register 34A. These gates are controlled by the corresponding gate control lines 54 and by various other instrumentalities which will be described hereinafter.

When any one of the gate control lines 54 is energized, thereby signifying that a replacement operation is to take place, a replacement signal R, FIG. 3, is transmitted through an OR gate 72 to initiate a replacement cycle of the system. If the system is operating in a write mode, wherein information is being transferred from the central processing unit into storage, the Replace Write line 66, FIG. 4, is energized as an incident to the generation of the replacement signal R. If the system is operating in a read mode, wherein information is being transferred from storage to the central processing unit, a Replace Read line 74, FIG. 4, is energized as an incident to the generation of the replacement signal R.

It is assumed by way of example that the first subword in the selected main memory word line is to be replaced by the first subword in a selected replacement store word line. This being the case, the four subword address bits which are entered into the counting register 48, FIGS. 2 and 3, consist respectively of the binary digits "0000." It is not essential, of course, that the position of the replacement subword correspond numerically to that of the subword to be replaced, and in the general case this will not be true. Since this is to be the first subword replacement operation performed in the word line under consideration, the four subword address bits initially entered into the counting register 48 are transferred without change into a decoder 50, otherwise designated "decoder B," which converts the four-bit input to a 1-out-of-16 output, thereby energizing a selected one of sixteen gate control lines 82. In the present instance the number 1′ gate control line 82 is energized. The function of the similarly numbered reset lines 83 will be explained hereinafter.

The gate control lines 82 coming from the decoder B, FIG. 4, control the operations of the replacement flip-flops in the replacement register 34B. Thus, for instance, the number 1′ gate control line 82 is connected to one input terminal of each of a series of AND gates 84 that are associated with the 64 replacement flip-flops FF(1′, 1′) to FF(1′, 64′) in the first-subword set of replacement flip-flops. This number 1′ gate control line also is connected to one input terminal of each of a series of AND gates 86 respectively associated with the first-subword set of replacement flip-flops FF(1′, 1′) to FF(1′, 64′). The output terminal of each AND gate 84 is connected to a common transfer line 70, mentioned hereinabove. Another input terminal of each AND gate 84 is connected to the Replace Read control line 74. The output terminal of each AND gate 86 is connected through an OR gate 87 to the binary 1 input terminal of a corresponding replacement flip-flop in the set FF(1′, 1′) to FF(1′, 64′). The binary 1 output terminal of such flip-flop is connected to the third input terminal of its corresponding AND gate 84. The remaining input terminal of each AND gate 86 is connected to a common transfer line 88, to which the output terminals of AND gates such as 62, FIG. 4, are connected.

AND and OR gates similar to 84, 86 and 87 are associated with each of the other replacement flip-flops in the replacement register 34B. These gates operate under the control of the gate control lines 82 and various other instrumentalities which will be mentioned hereinafter.

It has been assumed that the first subword in the selected line of the main memory 10 is to be replaced by the first subword in the selected line of the replacement store 17. If a reading operation is to be performed, the contents of the main memory word line are first transferred into the transfer register 34A, FIG. 2, and the contents of the selected replacement store word line are transferred into the replacement register 34B. It should be noted that the entire contents of a word line are transferred in each case, irrespective of which subword registers 14 are good or defective, and even though some of the replacement subwords come from registers 18 which are not related to the particular main memory word line under consideration. In the case of the first subword, the data bits from the main memory are transmitted through input lines such as 90, FIG. 4, and OR gates such as 69 into the first-subword register flip-flops FF(1, 1) to FF(1, 64). The first-subword replacement bits from the replacement store 17 are transmitted through input lines such as 92, FIG. 4, and OR gates such as 87 into the first-subword replacement flip-flops FF(1′, 1′) to FF(1′, 64′). Other subword transfers from the main memory 10 into the transfer register 34A, and from the replacement memory 17 into the replacement register 34B, are handled in a similar manner, concurrently with the subword transfer just described, and at the conclusion of this operation the transfer flip-flops in the transfer register 34A now register the entire contents of the selected word line in the main memory 10, and the replacement flip-flops in the replacement register 34B now register the entire contents of the selected word line in the replacement store 17. At this point the apparatus is ready for performing any subword replacement operations that are needed.

Inasmuch as the transfer flip-flops FF(1, 1) to FF(1, 64) contain erroneous information read out of a defective subword register 14, these flip-flops first must be reset to erase the erroneous information stored therein. Referring to FIG. 3, it will be noted that the output line 52 from the decoder A flip-flop FF1 is coupled through an AND gate 92 to the "number 1" line in a group of reset lines 94, FIGS. 3 and 4. Similar AND gates are provided for the other reset lines 94 in this group, which are controlled respectively by the flip-flops FF2 to FF16. All of these AND gates are further controlled by a Reset Transfer Register line 96. When the line 96 is pulsed, it passes a signal through the gate 92 (which already has been conditioned by the output of FF1) to the "number 1" reset lnie 94 that is connected to the reset terminals of all of the first-subword transfer register flip-flops FF(1, 1) to FF(1, 64), FIG. 4. Thereupon the transfer register flip-flops in the first subword set are reset to their binary 0 states.

When this has occurred, the Replace Read control line 74, FIG. 4 is pulsed, thereby conditioning AND gates such as 84 to transmit the settings of their respective subword replacement flip-flops FF(1′, 1′) to FF(1′, 64′) through common transfer lines such as 70 to the input gates such as 68 of the transfer register flip-flops in register 34A. This causes the first-subword transfer flip-flops FF(1, 1) to FF(6, 64), whose input gates 68 are now open, to be set in accordance with the settings of the replacement flip-flops in the first subword group FF(1′, 1′) to FF(1′, 64′). Thus, the erroneous main memory subword initially stored in the transfer register 34A has been replaced therein by an accurate subword taken from the replacement store. Hence, when the central processing unit 32 subsequently calls for data from the transfer register 34A, the transfer flip-flops in the first subword group will supply the information which was stored in the first subword register of the replacement store 17 rather than the information which was erroneously stored in the defective first-subword register of the main memory 10.

If more than one defective subword is contained in the same word line of the main memory, the replacement cycle must be extended or renewed as required until all of the defective subwords in that line have been replaced. The control circuitry of decoder A, FIG. 3 provides for such extension of the replacement cycle where necessary. In the present example it has been assumed that the first and sixteenth subword registers 14 in the selected word line 12 of the main memory are defective. Therefore, the decorder flip-flops FF1 and FF16, FIG. 3, are set to their binary 1 state, whereas the other decoder flip-flops FF2 to FF15 remain in their binary 0 states. After the first subword replacement operation has been effected as described hereinabove, a "follow" pulse is placed on a control line 98, FIG. 3. AND gates such as 100, 101, 102 and 103 respectively associated with the decoder flip-flops FF1 to FF16 have input terminals thereof connected to the control line 98. Only one of these gates is active at a given time. In the present instance, gate 100 is active because it is directly controlled by the output of FF1, which presently is in its binary 1 state. Hence, when a follow pulse is placed upon the line 98, it passes through the gate 100 to the reset terminal of flip-flop FF1, thereby resetting this flip-flop to its 0 state. The binary 0 output terminal of FF1 is connected to one of the input terminals of each of the remaining AND gates such as 56, 58 and 60, which were mentioned hereinabove. Each of these AND gates is so constituted that it is conductive only if its associated flip-flop is in a binary 1 state and all of the preceding flip-flops are in their binary 0 states. In the present case, only the gate 60 is conductive after the flip-flop FF1 is reset. The follow pulse terminates after the flip-flop FF1 is reset and before the flip-flop FF16 can be reset. Hence, FF16 furnishes an output signal on its output line 104 to the OR gate 72 for thereby continuing the replacement signal R and enabling a new replacement cycle to be performed, and it also energizes the "number 16" gate control line 54.

The follow pulse also performs the additional function of increasing by 1 the count registered by the counting register 48, FIG. 3. The control line 98 is extended to a "count +1" input terminal of the register 48 so that each follow pulse will impart a one-digit increment to the setting of register 48. The setting of the decoder 50 thereupon is advanced from 1′ to 2′, thereby energizing the "number 2′" gate control line 82.

As a result of the foregoing operations, the subword transfer and replacement apparatus 34 is conditioned for replacing the subword read out of the sixteenth position in the main memory with the subword read out of the second position in the replacement memory. The energization of the Replace Read control line 74 conditions the apparatus for transferring a stored subword out of the replacement flip-flops numbered FF(2′, 1′) to FF(2′, 64′) in the second subword set. The transfer flip-flops in the sixteenth subword set FF(16, 1) to FF(16, 64) meanwhile have been reset, and they are now set again under the joint control of the "number 16" gate control line 54 and the replacement flip-flops in the second subword group FF(2′, 1′) to FF(2′, 64′).

The next follow pulse which is applied on the control line 98, FIG. 3, resets the decoder flip-flop FF16, thereby terminating the replacement signal R so that no further replacement cycles can occur. The system then reverts to its normal operation, which in the present instance is assumed to be a read operation, and it is at this point that the contents of the transfer register 34A are read out and transmitted to the central processing unit. The counting register 48 is reset by means not shown. In the present example, the word line transmitted from the register 34A to the CPU includes first and sixteenth subwords obtained from the replacement store 17, and second to fifteenth subwords obtained from main memory 10.

A writing operation which requires the replacement of defective subwords is accomplished in a manner similar to that described hereinabove for the "replacement read" operation. Information which is to be transferred from the central processing unit into storage is first entered into the transfer register 34A, where it is stored in the transfer flip-flops. If any of the subword registers on the selected line of the main memory 10 are defective appropriate information is furnished by the read-only memory 20 to the control unit 36 (during the clear cycle which precedes each write cycle) for activating the selected gate control lines 54 and 82. The control circuitry shown in FIG. 4 thereupon conditions the subword transfer and replacement apparatus 34 for transferring information from the transfer register 34A into the replacement register 34B in every location where a subword replacement is to be effected.

For instance, let it be assumed that the first subword register 14 in the selected main memory word line 12 is defective, and that information from the CPU is to be stored in the first subword register on a selected line 19 of the replacement store 17. The "number 1'" gate control line 82, FIGS. 3 and 4 is energized, so that when the Reset Replacement Register control line 106, FIG. 3, is energized, it acts through the AND gate 108 (now open) to energize the "number 1'" reset line 83, thereby causing the first-subword replacement flip-flop FF(1', 1') to FF(1', 64') to be reset. Energization of the "number 1" gate control line 54 and the "number 1'" gate control line 82 also conditions the AND gates 62 and 86, FIG. 4, so that when the Replace Write control line 66, FIG. 4, is energized, these AND gates are rendered conductive, thereby causing the contents of the transfer flip-flops FF(1, 1) to FF(1, 64) in the first subword group to be transferred by way of gates 62, transfer lines such as 88 and gates such as 86 and 87 into the first-subword replacement flip-flops FF(1, 1') to FF(1', 64'). This type of action is repeated in turn for each of the defective subwords. The transfer register flip-flops are not reset. When it is time for the contents of the input-output registers 34A and 34B to be transferred into storage, those information subwords which otherwise would be stored only in defective subword registers 14 of the selected main memory word line 12 are stored also in good subword registers 18 of the selected replacement memory word line 19. This does not imply that the defective subword register 14 will be prevented from receiving any information. No harm is done in storing information incorrectly in these defective subword registers as long as such information also is stored correctly in good subword registers of the replacement memory 17. At the appropriate time a choice will be made between the information stored in the defective subword registers and the information stored in the good replacement registers.

Figure 5:
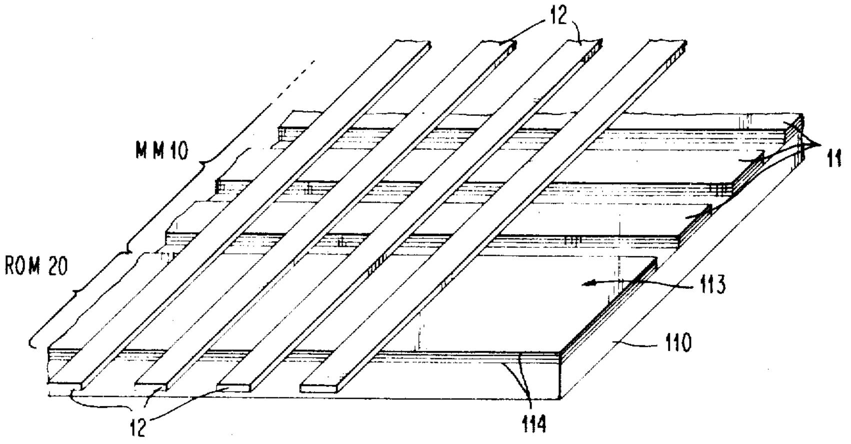
FIG. 5 is a perspective view showing a portion of the memory array construction.

The read-only memory 20, FIG. 1, preferably is constructed as an integral part of the main memory 10. It is quite small in size compared with the main memory 10, however. Whereas the main memory contains 1024 bits per word line, the read only memory 20 contains only 42 bits per word line, or approximately 4% of the main memory capacity. FIG. 5 shows the physical relationship of the read-only memory 20 to the main memory 10. Both memories have a common ground plane 110, which serves as a return path for currents in the drive lines of the array. Upon this ground plane 110 are successively deposited, in accordance with conventional practice, layers of insulation, magnetic film and conductive material. Bit-sense lines 11 are etched through the layers of conductive and magnetic materials in the main memory portion of the array. In the portion of the array which is reserved for the read-only memory 20, however, no bit lines are etched out, inasmuch as no writing operations are performed in a read-only memory. Hence, in this portion of the array there is left a continuous sheet 113 of laminated material which, for present purposes, will be regarded as a thick magnetic film, each of the magnetic layers 114 in the laminated sheet 113 being at least 800 A. thick.

The word strips 12 of the array are laid on top of the bit-sense lines 11 and their magnetic strip coatings. Those portions of the word lines 12 that extend across the continuous magnetic film 113 correspond to the word line portions 12A, 12B and 12C, FIG. 1, which extend respectively through the error flag store 22, the replacement address store 24 and the check bit store 26. For simplicity of description, however, the functional distinctions between these various word line sections will be disregarded hereinafter, and each word line 12 will be treated as an integral strip extending through the read-only memory section of the array. Omitted from this view are the magnetic keeper layers which customarily are provided in the word lines 12.

Figure 7:
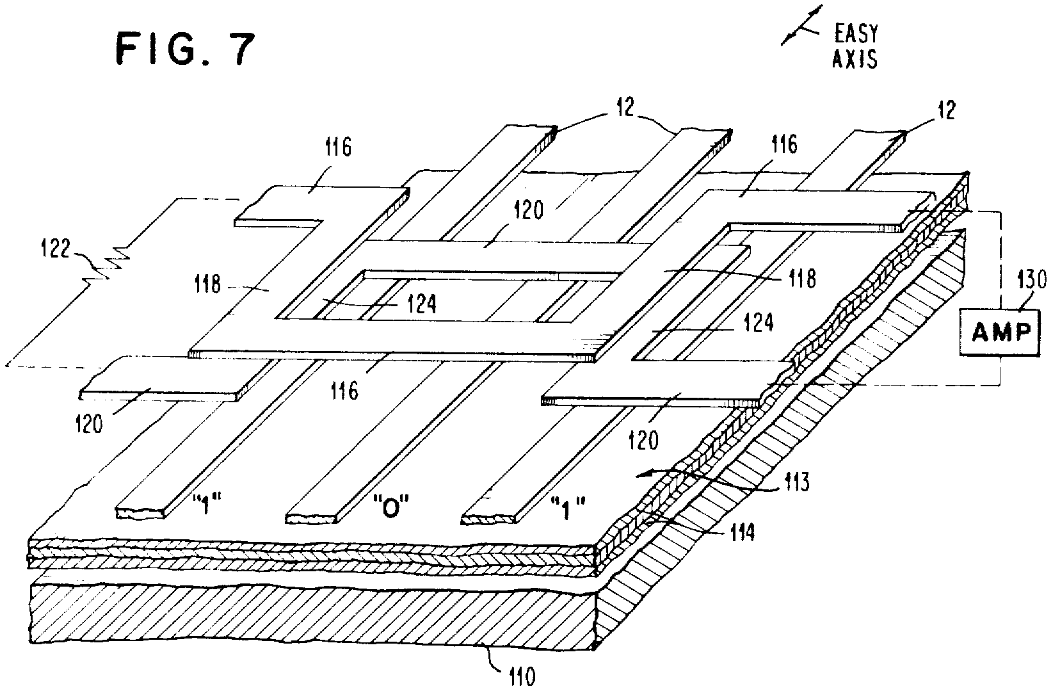

In the read-only memory 20 the output signals are produced on sense lines which by their distinctive configurations determine whether a binary 1 or binary 0 will be read out of each specific bit position. For best results the sense lines are arranged in complementary pairs. FIG. 7 shows a typical sense line pattern for reading binary 1 and 0 bits from various bit positions on three different word lines 12. The upper sense line 116 generally extends at right angles to the word lines 12, but at each bit position where it is desired to read out a binary 1, the sense line 116 has a transverse leg portion 118 that extends parallel with the word line 12. This introduces an offset into the sense line 116. However, the offset portion of the sense line 116 is within the general boundaries of the bit storage position. At locations where a binary 0 is to be read out, the sense line 116 extends across the word line 12 at right angles thereto, and there is no transverse leg portion as 118 extending parallel with the word line at that point. Thus, referring to the example shown in FIG. 7, the sense line 116 is arranged so that a binary 1 signal is induced therein when either the first or the third of the three illustrated word lines 12 is pulsed, but no signal is induced in the sense line 116 when the second word line 12 is pulsed.

In order to provide a stronger pick-up signal, and also to cancel any unwanted noise signals that may be induced in the sense line, a lower sense line 120 is arranged in complementary relation to the upper sense line 116, as shown in FIG. 7. (The supporting structure for these two sense lines is omitted from this view.) The two sense lines 116 and 120 are connected at one end thereof through a suitable terminating resistor 122, placing them in series with each other. The lower sense line 120 has transverse leg portions 124 therein at the various bit positions where it is desired to read out binary 1's. These leg portions 124 extend parallel with the respective word lines 12. At locations where binary 0 is to be read out the lower sense line 120 is at right angles to the word line 12. The offset portions of the upper and lower sense lines 116 and 120 are arranged in opposite fashion, thereby giving a rectangular looped configuration to the combined sense line, 116–120, at those bit locations where binary 1's are stored.

Figure 6:
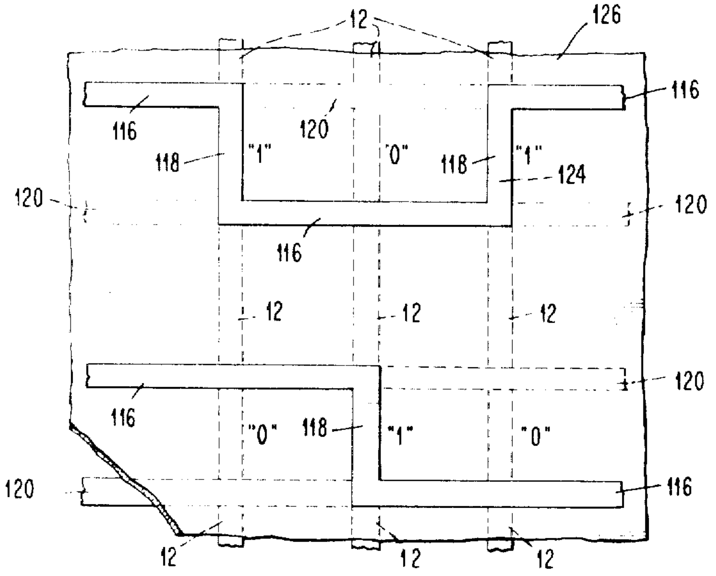
FIGS. 6 to 9 are partially schematic views illustrating a type of read-only memory which can be employed in the memory system of FIGS. 1 and 2.
Figure 8:
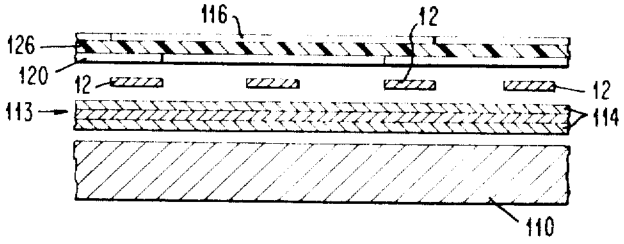
Figure 9:
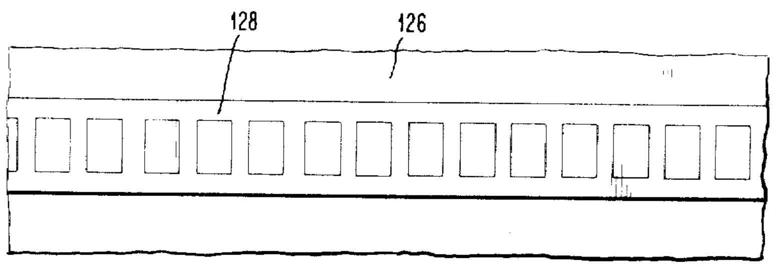

The sense line pattern preferably is formed on a plastic insulating sheet 126 (shown in FIGS. 6 and 8 but omitted from FIG. 7) which is laid over the word line pattern 12. To form this pattern, the upper and lower sense lines 116 and 120 are etched out of copper layers on opposite sides of a three-ply copper-plastic-copper laminated sheet, which is commercially available. This etching process is done in several steps, as follows:

First, a ladder pattern 128, FIG. 9, is etched in the copper layer on each surface of the sheet 126 at every location where there is to be a sense line in the read-only memory. Initially these patterns are identical for both upper and lower sense lines. The above-mentioned diagnostic test of the main memory 10 then is performed, and from this it is determined which of the leg and rung portions of each ladder pattern 128 are to be interrupted or deleted. Photo-resist or other protective material is applied to those portions of the ladder pattern which are to be preserved intact, and the unproteced portions of the ladder pattern then are etched away to define the distinctive configurations of the sense lines. The testing and masking operations may be done under computer control. The eroded configurations of the various ladder patterns, after the final etching process, will provide the desired pattern of error flag bits, replacement address bits and check bits required for this particular memory system. The ladder-pattern approach greatly reduces tolerance requirements for the photo-etching operations.

The output terminals of each sense line pair 116–120 are connected to a differential amplifier 130, there being one such amplifier for each pair of sense lines. The portion of the magnetic film 114 at each crossover between a sense line pair and a word line is considered to be a read-only memory cell. The easy axis of the magnetic film 114 extends parallel, or substantially parallel, with the word lines 12. Inasmuch as the read-only memory has no bit lines for controlling the direction of the remanent magnetization, the magnetization of the film 114 normally is in a split-up, antiparallel state along its easy axis, this being the normal demagnetized state of a thick anisotropic magnetic film. When a word current pulse is sent through one of the word lines 12, the various magnetic moments in the film 114 are rotated from their easy-axis positions parallel with the word lines 12 into positions which are at right angles to the word line 12, at all bit positions along the active word line. At each bit location where the sense lines have leg portions 118 and 124 extending parallel with the active word line 12, voltages will be induced in these leg portions 118 and 124, thus generating a "1" readout signal which is fed to the sense amplifier 130. Due to the complementary arrangement of the sense lines 116 and 120 in each pair, the induced voltages are of the differential-mode type and will be in aiding relationship to each other, thereby giving the effect of a two-turn winding at each pickup point. At those bit locations where the sense lines 116 and 120 merely cross the word line at right angles thereto, the rotation of the magnetic moments through opposite directions into positions perpendicular to the active word line 12 will induce no signal voltages in the sense lines 116 and 120 (neglecting for the moment the capacitive-coupled noise and other spurious signals that may be induced in the sense lines 116 and 120 at each bit location where a binary 0 is stored).

As just indicated spurious signals may be induced in a sense line due to capacitive couplings between the sense line and the word line, or because the magnetization of the film underneath the crossings of word and sense lines is not completely split up along the easy axis of the film due to the fact that this easy axis is slightly skewed. By utilizing a complementary pair of sense lines 116 and 120, the output signals of which are fed to a differential amplifier 130 as shown in FIG. 7, these spurious signals are of the common-mode type and will be cancelled at the differential amplifier 130.

The read-out memory construction which has been described above is not the only form of read-only memory that can be employed in the disclosed type of memory system. However, from the standpoint of economy and reliability, it is considered to be a highly satisfactory means for permanently storing the corrective formation which will be needed in the bad-bit replacement operations of the memory system. It also fits conveniently into the general scheme of the disclosed bulk memory array in that it can utilize the same word drives as the main memory does. Moreover, the relatively small size of the read-only memory 20 enhances the probability that it can be made error-free, and, with the provision of error checking and correcting facilities, trouble-free operation is virtually assured.

DESCRIPTION OF OPERATION

The operation of the illustrated memory system will be summarized for the specific case where the first and sixteenth subword registers of a given main memory word line 12 contain defective bit cells, and they are to be replaced respectively by the first and second subword cell groups in a selected word line 19 of the replacement store 17. The selection of the replacement subword addresses is arbitrary, except that those replacement subwords which are to be inserted into the same information word should be positioned adjacent to each other on the same line 19 of the replacement store 17.

It is contemplated that the replacement subwords will enter the transfer register in sequence. Where there are a great many defective subwords in the same word line, this may prolong the transfer operation a substantial amount. A more elaborate transfer and replacement apparatus, such as one which employs crossbar switching circuitry or the like, would enable a plurality of subwords on the same word line to be replaced simultaneously, rather than in sequence, but such results would be accomplished at the expense of utilizing more equipment than the scheme shown herein. For the present it is assumed that such additional expenditure is not necessary or desirable. On the basis of present knowledge, it is believed that instances where more than two or three defective subwords are likely to appear in the same word line will be very rare, if they occur at all.

During the final diagnostic test which is performed on the memory system before it is placed in service, the locations of defective subword registers 14 in the main memory 10 are detected. The error flag cells in the read-only store 22 then are permanently "marked" in accordance with this information (this being done preferably under computer control). Thus, in the present example, wherein the first and sixteenth subwords in the word line 12 under consideration are assumed to be defective, the first and sixteenth error flag cells in the corresponding line of the read-only store 22 are permanently fashioned or otherwise set to store "1," while the remaining error flag cells in the same line are permanently fashioned or set to store "0," in the manner explained above, for example. Adjacent subword cell groups in the replacement store 17 are selected to store the data that normally would be stored in the defective subword registers under consideration. Since it is assumed inthe present instance that the replacement subwords will be located in the first and second subword positions, the read-only memory cells in the subword address portion of the replacement address store 24 are set to register the first replacement subword address "0000" (four bit cells being utilized for registering any one out of sixteen possible subword positions). The remaining sixteen bit cells of the read-only sore 24 are set to register the identifying number of the replacement word line in which the replacement subwords are to be stored for the particular main memory word line under consideration.

The only remaining information which must be stored in the read-only memory 20 consists of the check bits of the error detecting and correcting code, which are entered into the check bit sore 26. These check bits are utilized in the error correcting unit 44 to insure that control data are read correctly from the read-only stores 22 and 24. Inasmuch as the error flag store 22 and the replacement address store 24 together contain 36 bits per word line, adequate error detection and correction can be provided in accordance with known methods by utilizing six check bits per word line.

When all of the desired control data been permanently stored in the read-only memory 20 as a result of the diagnostic test and the other corrective procedures described above (which may be done under computer control), the memory system is ready for practical operation.

REPLACEMENT WRITING OPERATION

During a writing operation, the subwords of the data word to be stored in the memory system are first transferred from the central processing unit (CPU) 32 to the transfer register 34A (FIGS. 2 and 4) of the subword transfer and replacement apparatus 34. The desired word drive line of the main memory 10 is energized during a preliminary clearing operation, thereby activating the corresponding drive line of the read-only memory (ROM) 20. The 36 bits of control data and six check bits on this ROM drive line are read from ROM 20 to the error correcting unit 44, where any necessary corrections are made in the control data that has been read out. Thereupon the control data bits are transferred from unit 44 to the control unit 36 and to the replacement line selector 42, as follows:

The sixteen error flag bits are entered into the flip-flops FF1 through FF16 of decoder A, FIGS. 2 and 3.

The four replacement subword address bits are entered into the counting register 48, thence (without change) into decoder B (assuming that this is to be the first subword replacement operation for the particular word line under consideration).

The sixteen replacement word line address bits are entered into the replacement line selector 42 for activating the appropriate word line 19 of the replacement store 17.

A "replace write" operation involves a transfer of stored data from the register 34A to the replacement register 34B. Decoder A selects the first set of 64 transfer flip-flops in register 34A from which data are to be transferred into the replacement store, and it conditions this set of flip-flops for transferring its stored data (i.e., the first subword that was received from the CPU) into a particular set of replacement flip-flops in register 34B selected by decoder B for the reception of such data. Thus, in the present instance, the transfer flip-flops FF(1, 1) to FF(1, 64) are conditioned for subsequently transferring the first subword received from the CPU into the first set of replacement flip-flops FF(1', 1') to FF(1', 64'). Prior to such transfer, the decoder B resets this first set of replacement flip-flops to prepare it for receiving said subword from the transfer register flip-flops.

The decoder A also conditions the sixteenth set of transfer flip-flops FF(16, 1) to FF(16, 64) for subsequently transferring the sixteenth subword into the second set of replacement flip-flops FF(2', 1') to FF(2', 64'). Such transfer operation does not immediately occur, however.

Decoder A furthermore generates a control signal R for initiating the first replacement cycle. As one of the initial steps therein, the entire word stored in the selected replacement word line 19 is transfered to the replacement register 34B, following which the first subword section of this replacement register is reset to receive a new subword. Then, as an incident to the generation of signal R, the "Replace Write" control line 66, FIG. 4, is energized under the control of signal R for causing the information stored in the first subword section of the transfer register 34A to be transferred into the first subword section of the replacement register 34B. When the contents of register 34B are thereafter read back to RS 17, the new first subword will be transferred into the corresponding replacement subword group 18 in the selected word line 19 of the replacement store 17.

With the sixteenth subword register 14 in the main memory word line 12 also being defective, it is now necessary to extend or re-initiate the replacement cycle in order to store the sixteenth subword in the replacement memory 17. Such operation is initiated when a follow pulse is placed on the control line 98 (FIG. 3) of decoder A, thereby resetting FF1 so that it furnishes a "0" output signal. If all the other flip-flops FF2 to FF16 had been set to their zero states, this would have terminated the replacement operation. However, with the FF16 in its "1" state, the gate 60 now passes a signal from FF16 through line 104 to gate 72 for generating a replacement signal R. Thus, a new replacement cycle occurs. The follow pulse also is applied to counting register 48 for advancing the count by one binary digit, thereby changing the replacement subword address from "0000" to "0001."

In the course of the ensuing replacement cycle, the subword stored in the sixteenth subword section of the transfer register 34A is transferred to the second subword section of the replacement register 34B (which previously had been reset under the control of decoder B). Thence the subword is transferred into the corresponding replacement subword group 18 in the selected line 19 of the replacement store 17. Flip-flop FF16, FIG. 3, is reset by the succeeding follow pulse. No further replacement signals R are generated by decoder A, because now all of the gates 100, 101, 102, 103, etc., are closed, and the replacement writing operation therefore is terminated.

All of the data subwords which are stored in the transfer register 34A are transferred at the appropriate time into corresponding subword registers 14 in the active word line 12 of the main memory 10, regardless of whether these subword registers 14 are good or defective. In other words, no attempt is made to block the entry of data into defective subword registers of the main memory. Replacement of subwords stored in any defective registers 14 is accomplished during the subsequent readout operations, as described below.

The Replacement Writing Operation can be summarized in the following steps:

(1) Transmit the incoming data word from the CPU to the transfer register 34A.

(2) During the "clear" cycle (while the old word is being erased from the selected main memory word line) read the contents of the corresponding word line in read-only memory 20.

(3) Perform error check and correction (if needed) on the control word read from ROM 20.

(4) Transfer sixteen error flag bits into decoder A. Transfer four replacement subword address bits into register 48 for setting decoder B to the initial replacement subword address. Transfer sixteen replacement line address bits into line selector 42.

(4a) If no replacement signal R is emitted by decoder A (all error flag bits being 0), execute a normal writing operation to transfer the incoming data word from register 34A to main memory 10 only, with none of this information being written into replacement store 17.

(4b) If a replacement signal R is emitted by decoder A, continue with step 5 below:

(5) Start a read-rewrite operation of the replacement store 17, using the 16-bit line address furnished by the replacement address store 24 to select the proper word line 19 in replacement store 17, causing the contents thereof to be transferred to the replacement register 34B.

(6) Using the four-bit subword address furnished by the counting register 48 to decoder B, reset certain flip-flops in the replacement register 34B (as selected by decoder B) to prepare them for receiving a new replacement subword from the transfer register 34A.

(7) Apply a Replace Write pulse to register 34A, causing the transfer of a subword from certain flip-flops in register 34A (as selected by decoder A) into those flip-flops in register 34B which have been selected by decoder B.

(8) Apply a Follow pulse to decoder A, thereby erasing its setting and advancing it to the next setting (if any). Also apply the Follow pulse to register 48, thereby advancing the setting of decoder B one digit.

(8a) If no further replacement signal R is emitted by decoder A, perform a writing operation in the main memory 10, transferring the information from register 34A into the selected word line of the main memory 10. Also complete the rewrite operation in the replacement store 17, transferring the information from register 34B into the selected word line of the replacement store 17.

(8b) If a replacement signal R is emitted by decoder A, repeat steps 6, 7 and 8 above.

REPLACEMENT READING OPERATION

The subwords of the data word to be entered into the central processing unit (CPU) are first read from storage into the subword transfer and replacement apparatus 34. Thus, the contents of the addressed word line 12 in the main memory 10 are stored in the flip-flops of the transfer register 34A, FIGS. 2 and 4. No attempt is made to prevent the data stored in the defective subword registers from being read out of the main memory 10 into the transfer register 34A. Certain of the subwords stored in register 34B subsequently will be substituted for erroneous subwords stored in register 34A.

Simultaneously with the reading of the main memory word line, as just described, the accompanying control information is read out of the read-only memory 20, checked and corrected (if necessary) and entered into the control unit 36. The decoders A and B are rendered effective in response to such information for selecting the particular set of transfer flip-flops and the particular set of replacement flip-flops which are to be placed in communication with each other, assuming that a replacement reading operation is called for. Also, a replacement signal R is furnished to the system by decoder A, causing a word to be transferred from the selected replacement store word line 19 into register 34B. These control functions are performed in the manner explained above in connection with the replacement writing operation.

Assuming that the first subword register 14 in the addressed word line 12 of the main memory 10 is defective, the first set of transfer flip-flops FF(1, 1) to FF(1, 64) is reset by decoder R in order to receive a correct replacement subword from register 34B. It is assumed that the first replacement subword will come from the first replacement subword group 18. The first set of replacement flip-flops FF(1′, 1′) to FF(1′, 64′) is conditioned by the counting register 48 and the decoder B to supply the correct replacement subword. The "Replace Read" control line 74, FIG. 4, is energized under control of the replacement signal R (FIGS. 2 and 3) for causing information stored in the first subword section of the replacement register 34B to be transferred into the first subword section of the transfer register 34A, from whence it eventually will be transferred to the CPU.

Application of the follow pulse to control line 98, FIG. 3, in due course resets FF1 in decoder A, thereby transferring control to the next active decoder flip-flop, which in this case is FF16. As a result of this, in the manner previously explained, the sixteenth set of transfer flip-flops FF(16, 1) to FF(16, 64) is reset to condition it for the reception of new data. A new replacement signal R is generated, and the counting register 48 is advanced one digit for conditioning the second set of replacement flip-flops FF(2′, 1′) to FF(2′, 64′) for data transfer. At the appropriate time, therefore, the second replacement subword from register 34B is entered into the sixteenth position of the transfer register 34A. The next follow pulse terminates the replacement operation, since there are no more replacement subwords to be inserted in this particular data word line.

When data are read from the transfer register 34A to the CPU at the appropriate time, the information word which is read out will include replacement subwords in its first and sixteenth subword positions derived from the replacement store 17, the remainder of the subwords being derived from the main memory 10. The two defective subwords of the main memory word line thus will have been eliminated.

The Replacement Reading Operation can be summarized in the following steps:

(1) Transfer the selected word line contents from main memory 10 into transfer register 34A. Read the contents of the selected word line in read-only memory 20.

(2) Perform error check and correction (if needed) on control data read from ROM 20.

(3) Transfer sixteen error flag bits into decoder A. Transfer four replacement subword address bits into register 48 for setting decoder B to the initial replacement subword address. Transfer sixteen replacement line address bits into line selector 42.

(3a) If no replacement signal R is emitted by decoder A (all error flag bits being 0), execute a normal reading operation for transferring the outgoing data word from register 34A to the CPU, without transmitting any information out of register 34B.

(3b) If a replacement signal R is emitted by decoder A, continue with step 4 below;

(4) Using the 16-bit line address furnished by the replacement address store 24 to select the proper word line in replacement store 17, transfer this selected replacement word from replacement store 17 into replacement register 34B.

(5) Using the error flag data furnished by read-only store 22 to decoder A, reset certain flip-flops in the transfer register 34A, as selected by decoder A, to receive a replacement subword.

(6) Apply a Replace Read pulse to register 34B, causing the transfer of a replacement subword from certain flip-flops in register B (as selected by decoder B) into those flip-flops of register 34A which have been selected by decoder A.

(7) Apply a Follow pulse to decoder A, thereby erasing its setting and advancing it to the next setting (if any). Also apply the Follow pulse to register 48, thereby advancing the setting of decoder B one digit.

(7a) If no further replacement signal is emitted by decoder A, read out information from register 34A to the CPU.

(7b) If a replacement signal R is emitter by decoder A, repeat steps 5, 6 and 7 above.

SUMMARY OF ADVANTAGES

The disclosed scheme for circumventing bad memory cells enables satisfactory data storage and data processing operations to be performed using a bulk memory in which as many as 0.1 percent of the bit cells are defective, without sacrificing more than about 6 percent of the good bit storage capacity of the bulk memory in the worst case and without requiring more than about 10 percent additional storage capacity in auxiliary read-only and replacement memories, regardless of the manner in which the bad bit cells are distributed throughout the bulk memory array. The present scheme imposes no limitations upon the number of bad bit cells that may be present in a word line or in any word subdivision; nor does it limit the number of defective subwords per word line; nor does it require that certain binary digit combinations (which otherwise could be used for representing data) be reserved exclusively for use as corrective codes. There is no limitation on the type of error which can be corrected—that is to say, it can be a permanently defective "1" bit or a permanently defective "0" bit, or a disturb-sensitive bit which changes readily from "1" to "0" or from "0" to "1."

The disclosed memory system achieves greater reliability with less cost than any previously known batch-fabricated memory system. The read-only memory 20 which stores the control data can be economically fabricated as part of the bulk memory. The read-only memory capacity need be only a little more than four percent of the bulk memory capacity. The replacement memory 17 can be part of the bulk memory or it can be a separate auxiliary memory, as described. In either event, it need not be completely devoid of imperfect cells, so long as the same are not used for storing information. With the word lines being subdivided into 16 subwords each, and assuming the worst case where 0.1 percent of the subwords each contain one defective bit cell out of 64, the capacity of the replacement store 17 need be only a little more than six percent of the bulk memory capacity, at most. The number of subwords per word line is optional. One additional flip-flop register (34B) containing 1024 flip-flops is required in the input-output transfer circuitry.

In the disclosed system, perfect words are transferred to and from the bulk memory with no delay. Imperfect words are transferred with only slight delays, due to the rapidity with which information can be read out of the read-only memory 20 and transferred between the flip-flop registers 34A and 34B. As mentioned above, maximum replacement speed can be obtained by using crossbar circuitry, if one desires to achieve this.

A computer-controlled procedure for detecting bad subwords in the main memory and for registering the locations of such subwords (as well as the addresses of the replacement subwords) in the sense line pattern of the read-only memory is quite feasible in the present state of the art. It could readily be adapted also to other forms of read-only memory construction.

While the invention has been particularly shown and described with reference to a preferred embodiment thereof, it will be understood by those skilled in the art that changes in form and details may be made therein without departing from the spirit and scope of the invention.

What is claimed is:

1. In a memory system having bit cells arranged in selectively addressable word lines, each word line being divided into a plurality of individually addressable subword registers, any of which may contain one or more defective bit cells, the combination comprising:

replacement-subword storage means containing bit cells arranged in a plurality of individually addressable subword storage groups, error flag cells separate from said subword registers arranged in lines respectively corresponding to the word lines of the memory system, the error flag cells in each line thereof being adapted to indicate which, if any, of the subword registers in its respective word line contain defective bit cells and the number of such defective subword registers, replacement address cells separate from said subword registers arranged in lines respectively corresponding to the word lines of the memory system, the replacement address cells in each line thereof being adapted to represent, when required, the address of at least one selected subword storage group in said replacement-subword storage means, selective addressing means for addressing any selected word line of the memory system and its corresponding lines of error flag cells and replacement address cells, and defective-subword replacing means operable under the control of the error flag cells and the replacement address cells in any addressed line thereof for causing any defective subword register in the corresponding word line of the memory system to be effectively replaced by a selected subword storage group in said replacement-subword storage means, as determined by the information stored in said error flag cells and said replacement address cells, said defective subword replacing means including:

a transfer register having sets of binary storage elements, each set normally corresponding to a respective one of the subword registers in any addressed word line of the memory system, the storage elements in each of said transfer register subword storage sets being capable of temporarily storing the bits of a subword that is being written into or read out from the memory system, replacement circuitry for effectively establishing temporary communication between selected ones of said transfer register subword storage sets and said replacement-subword storage groups, respectively, according to the information contained in the error flag cells and the replacement address cells in the addressed word line of the memory system, and replacement control means responsive to the number of defective subword registers represented by the error flag cells in any addressed line thereof for causing a like number of replacement-subword storage groups to be placed in communication with said transfer register by said replacement circuitry.

2. The combination set forth in claim 1, wherein said replacement circuitry includes:

a replacement register having sets of binary storage elements, each set normally corresponding to a respective one of the replacement-subword storage groups in any addressed word line of said replacement-subword storage means, the storage elements in each said replacement register subword storage sets being capable of temporarily storing the bits of a replacement subword that is being written into or read out from said replacement subword storage means, and gate means for establishing communication selectively in either direction between any of said transfer register subword storage sets and any of said replacement register subword storage sets according to the information contained in the error flag cells and the replacement address cells in the addressed word line of the memory system.

3. The combination set forth in claim 2, and replacement writing control means operable at least partially under the control of said replacement control means for conditioning said gate means to effect the transfer of temporarily stored subword data from any of said transfer register subword storage sets to any of said replacement register subword storage sets, according to the location of the defective subword register that is being replaced and the location of the storage group that is to store the replacement subword.

4. The combination set forth in claim 2, and replacement reading control means operable at least partially under the control of said replacement control means for conditioning said gate means to effect the transfer of temporarily stored subword data from any of said replacement register subword storage sets to any of said transfer register subword storage sets, according to tthe location of the defective subword register that is being replaced and the location of the storage group that is to furnish the replacement subword.

5. The combination set forth in claim 2, wherein said gate means includes gate circuit devices for establishing communication selectively in either direction between a selected plurality of said transfer register subword storage sets and a selected plurality of said replacement register subword storage sets, according to the number and locations of the defective subword registers indicated by the error flag cells and the locations of the replacement-subword storage groups indicated by the replacement address cells in the addressed word line.

6. The combination set forth in claim 5, wherein said selected replacement register subword storage sets occupy positions respectively corresponding to adjacent addresses in said replacement-subword storage means, one of said addresses being indicated by the replacement address stored in said replacement address cells.

7. The combination set forth in claim 6, wherein said gate circuit devices and said replacement control means are adapted to bring the selected replacement register subword storage sets into communication with the selected transfer register subword storage sets in a predetermined sequence, according to a progressive replacement address count.

8. The combination set forth in claim 7, wherein said gate circuit devices and said replacement control means are adapted to bring the selected transfer register subword storage sets into communication with the selected replacement register subword storage sets in a sequence determined by the relative order of the corresponding error flag bits.

9. In a memory system having bit cells arranged in selectively addressable word lines, each word line being divided into a plurality of individually addressable subword registers, any of which may contain one or more defective bit cells, the combination comprising:

replacement-subword storage means containing bit cells arranged in a plurality of individually addressable subword storage groups, error flag cells separate from said subword registers arranged in lines respectively corresponding to the word lines of the memory system, the error flag cells in each line thereof being adapted to indicate which, if any, of the subword registers in its respective word line contain defective bit cells and the number of such defective subword registers, replacement address cells separate from said subword registers arranged in lines respectively corresponding to the word lines of the memory system, the replacement address cells in each line thereof being adapted to represent, when required, the address of a selected subword storage group in said replacement-subword storage means when one of the subword registers in that line is defective and the address of the first of a series of successively arranged subword storage groups when a plurality of subword registers in said line is defective, selective addressing means for addressing any selected word line of the memory system and its corresponding lines of error flag cells and replacement address cells, and defective-subword replacing means operable under the control of the error flag cells and the replacement address cells in any addressed line thereof for causing any defective subword register in the corresponding word line of the memory system to be effectively replaced by a selected subword storage group in said replacement-subword storage means, as determined by the information stored in said error flag cells and said replacement address cells, said defective-subword replacing means including replacement control means responsive to the number of defective subword registers represented by the error flag cells in any addressed line thereof for causing a like number of successively arranged replacement-subword storage groups to be effectively substituted for the defective subword registers in the addressed word line.

10. The combination set forth in claim 9, wherein said defective-subword replacing means further includes transfer and replacement circuitry for causing the incoming data to be stored in both the defective subword registers and the corresponding replacement-subword storage groups and for causing such data to be read out of the replacement-subword storage groups to the exclusion of the defective subword registers.

11. In a memory system having bit cells arranged in selectively addressable word lines, each word line being divided into a plurality of individually addressable subword registers, any of which may contain one or more defective bit cells, the combination comprising:

replacement-subword storage means containing bit cells arranged in a plurality of individually addressable subword storage groups separate from said word lines and operable independently thereof, error flag cells separate from said subword registers arranged in lines respectively corresponding to the word lines of the memory system, the error flag cells in each line thereof being adapted to indicate which, if any, of the subword registers in its respective word line contain defective bit cells and the number of such defective subword registers, replacement address cells separate from said subword registers arranged in lines respectively corresponding to the word lines of the memory system, the replacement address cells in each line thereof being adapted to represent, when required, the address of at least one selected subword storage group in said replacement-subword storage means, selective addressing means for addressing any selected word line of the memory system and its corresponding lines of error flag cells and replacement address cells, and defective-subword replacing means operable under the control of the error flag cells and the replacement address cells in any addressed line thereof for causing any defective subword register in the corresponding word line of the memory system to be effectively replaced by a selected subword storage group in said replacement-subword storage means, as determined by the information stored in said error flag cells and said replacement address cells.

References Cited

UNITED STATES PATENTS

| | | | |
|---|---|---|---|
| 3,222,653 | 12/1965 | Rice | 340—172.5 |
| 3,234,521 | 2/1966 | Weisbecker | 340—172.5 |
| 3,245,049 | 4/1966 | Sakalay | 340—172.5 |
| 3,331,058 | 7/1967 | Perkins | 340—172.5 |
| 3,350,690 | 10/1967 | Rice | 340—172.5 |

PAUL J. HENON, *Primary Examiner.*

HARVEY E. SPRINGBORN, *Assistant Examiner.*